United States Patent [19]

Kah

[11] 4,125,124

[45] Nov. 14, 1978

[54] SEQUENCING VALVE

[76] Inventor: Carl L. C. Kah, 778 Lakeside Dr., N. Palm Beach, Fla. 33408

[21] Appl. No.: 710,792

[22] Filed: Aug. 2, 1976

[51] Int. Cl.² ............................................. F16K 21/00
[52] U.S. Cl. .................................. 137/119; 137/217; 137/624.13; 137/624.18
[58] Field of Search .............. 137/119, 624.13, 624.18, 137/625.11, 217

[56] References Cited

U.S. PATENT DOCUMENTS

| Re. 29,252 | 6/1977 | Miller | 137/119 |
|---|---|---|---|
| 3,369,565 | 2/1968 | Haggard, Jr. | 137/625.11 |
| 3,460,560 | 8/1969 | Kah, Jr. et al. | 137/119 |
| 3,524,470 | 8/1970 | Kah, Jr. et al. | 137/119 |
| 3,635,237 | 1/1972 | Kah, Jr. | 137/624.18 |
| 3,642,022 | 2/1972 | Kirby | 137/119 |
| 3,785,391 | 1/1974 | Miller | 137/119 |
| 3,924,652 | 12/1975 | Kah, Jr. | 137/625.11 |
| 4,005,725 | 2/1977 | Sato | 137/217 |
| 4,034,775 | 7/1977 | Slagel | 137/119 |

Primary Examiner—William R. Cline
Assistant Examiner—H. Jay Spiegel
Attorney, Agent, or Firm—Jack N. McCarthy

[57] ABSTRACT

A sequencing valve for distributing fluid from an inlet selectively to one or more of a plurality of outlets in response to pressure variation in the source fluid or fluid at other stations within the valve. The valve may be sequenced at the valve or remotely, is compact in construction, is configured to provide anti-siphoning protection, may be easily modified to accomplish several different modes of operation and various sequencing patterns, and is configured for easy maintenance of the various valving components.

31 Claims, 13 Drawing Figures

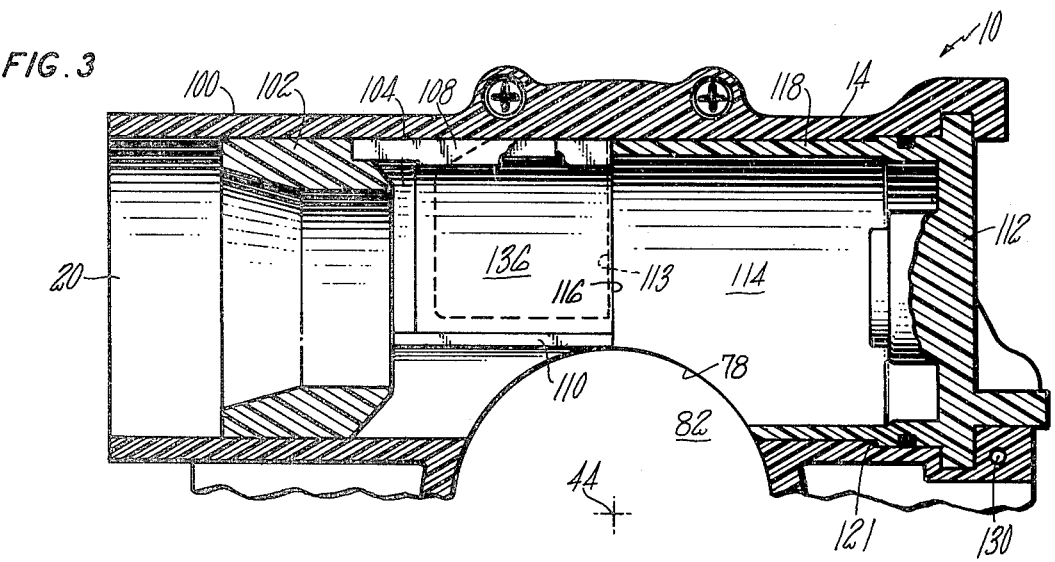
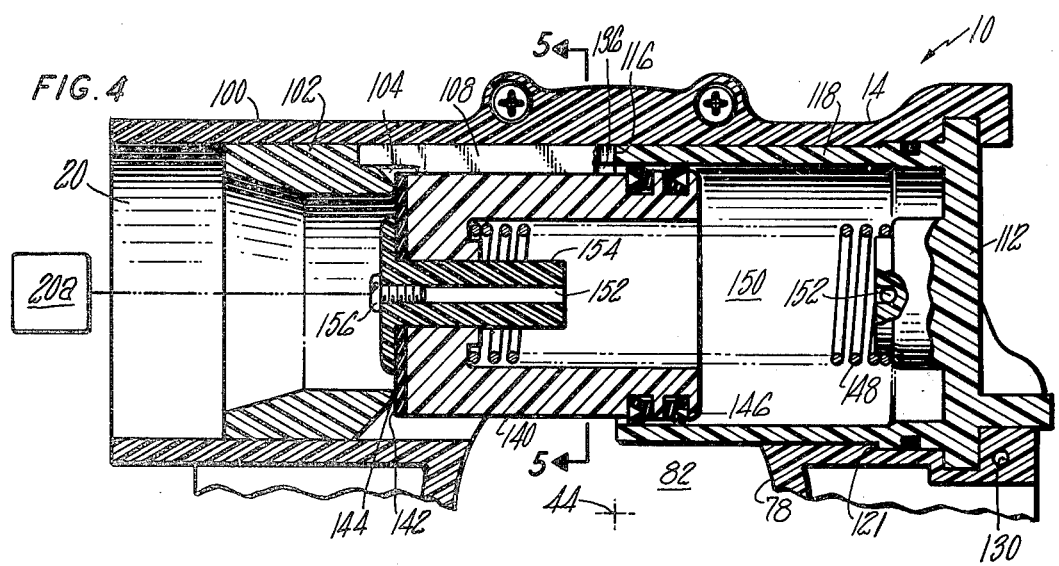
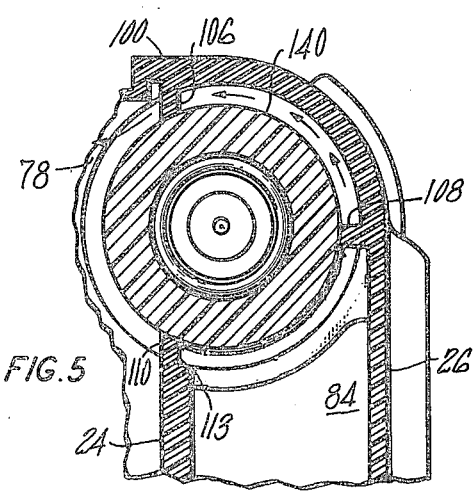
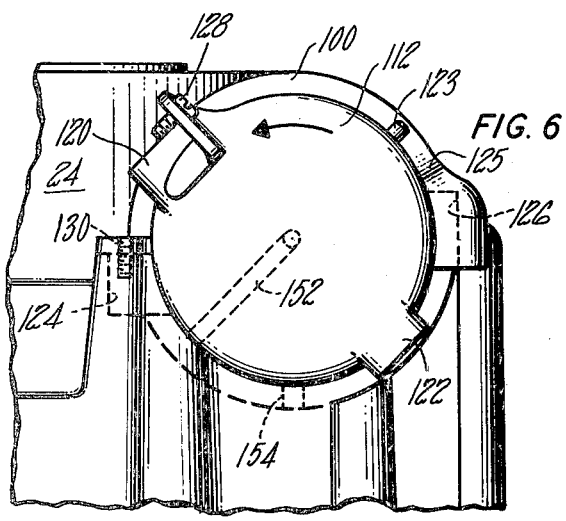

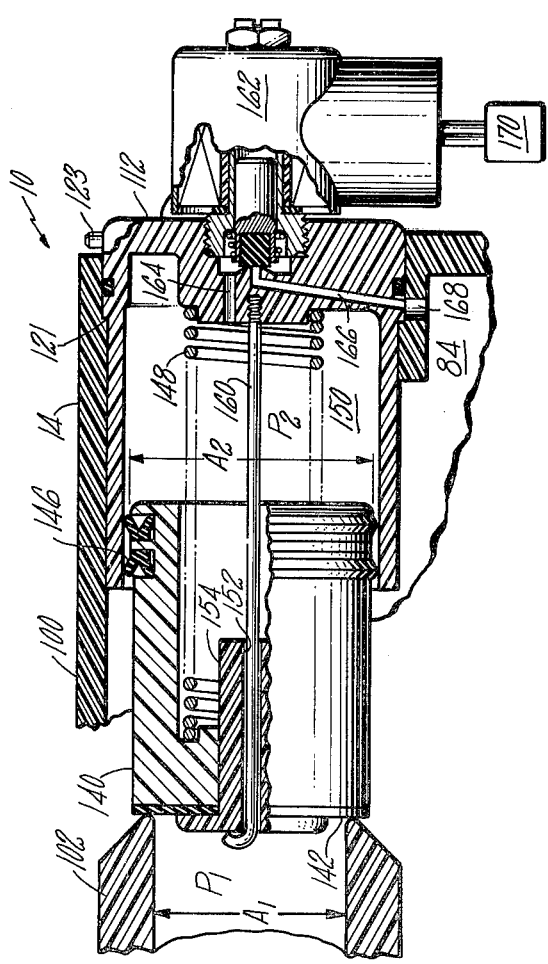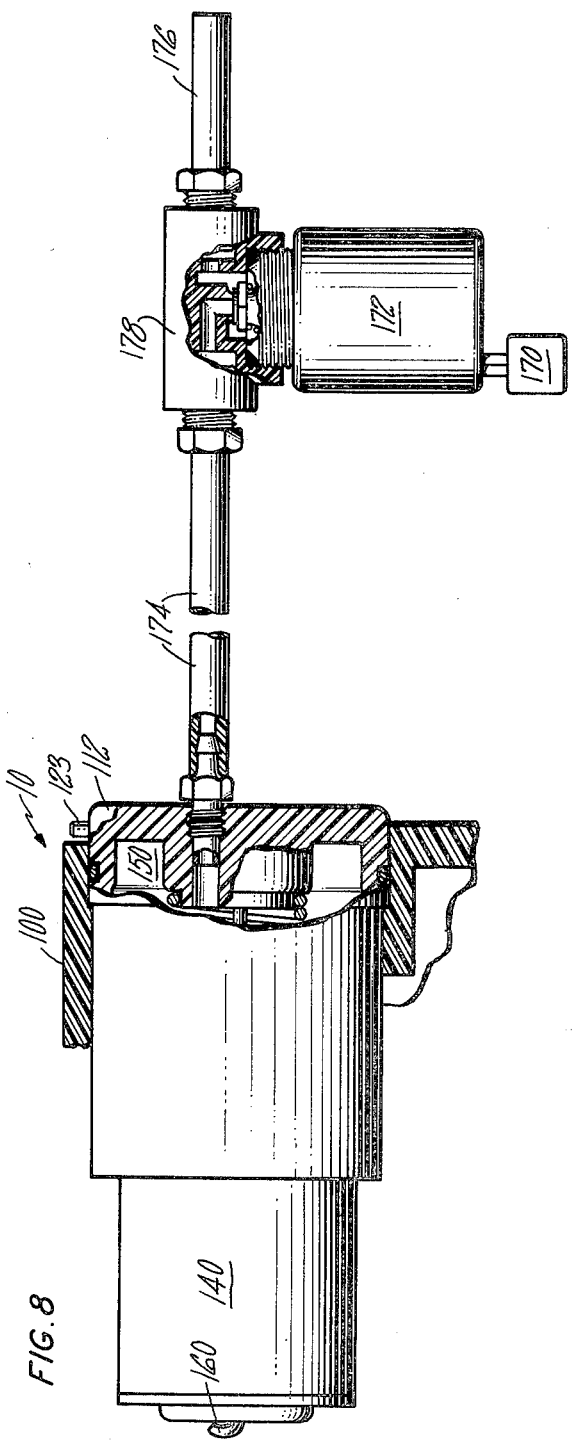

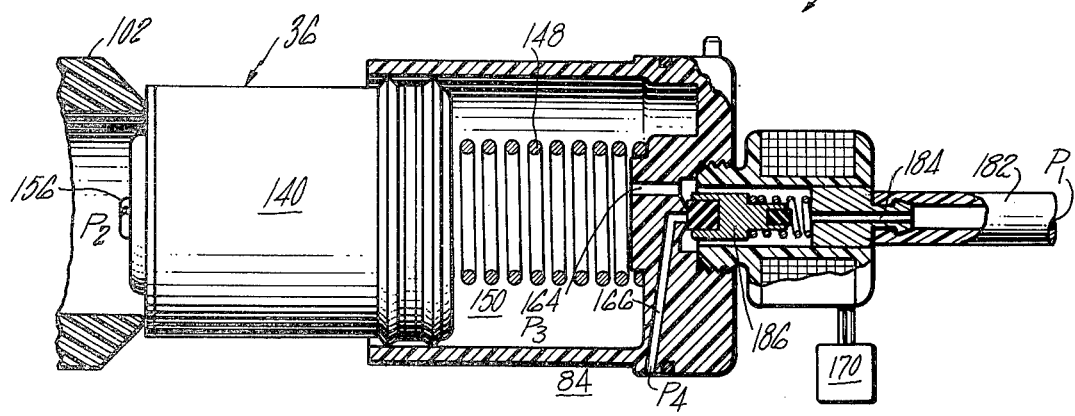
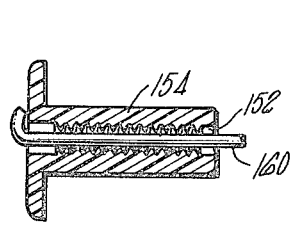
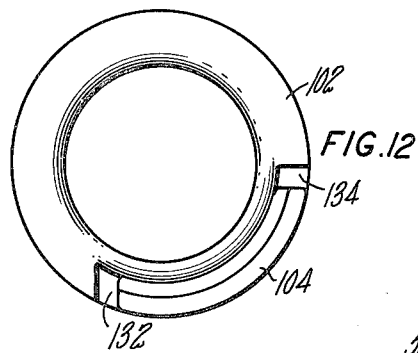
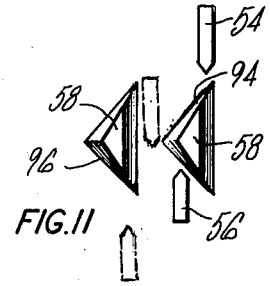
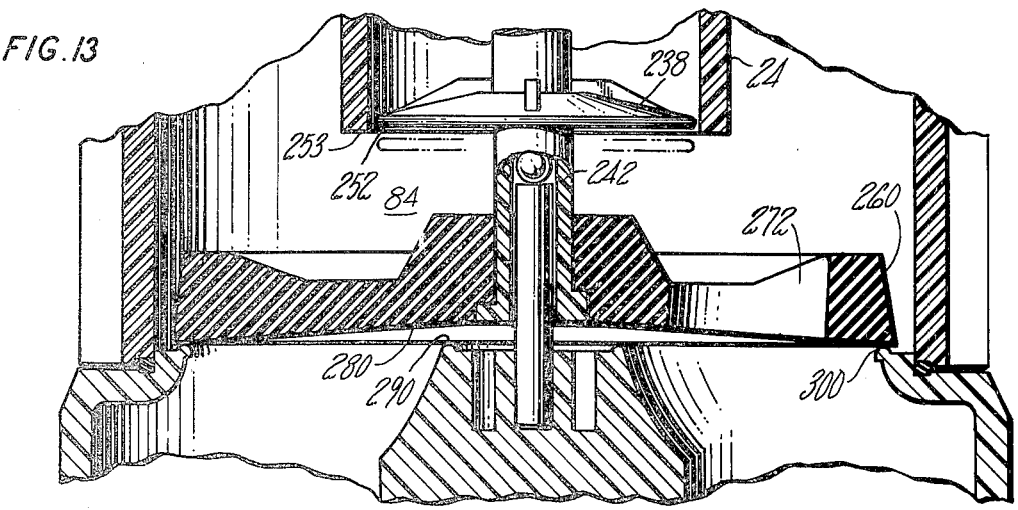

SEQUENCING VALVE

BACKGROUND OF THE INVENTION

1. Field of Invention

This invention relates to sequencing valves and more particularly to sequencing valves which selectively direct a source of fluid to one or more of a plurality of use outlets, which operate in optimum manner for the fluid system at hand, is configured to provide anti-siphon protection when connected to municipal water supplies, and which achieve these functions while being of minimum size and weight, having a minimum of moving parts which are easy to maintain.

2. Description of the Prior Art

Several different approaches have been made to provide a sequencing valve, but none have provided the features with the simplicity and compactness of the improved type disclosed herein. Classically, irrigation systems use a plurality of selectively positioned fluid distribution valves controlled remotely, either electrically or hydraulically, but such plural valve systems are more costly to install and maintain in view of the amount of apparatus and the total number of moving parts utilized. Sequencing valves which are directly controlled by solenoids have also been utilized, but have a higher pressure loss and greater complexity. Flow turbine operated valves have also been utilized but are overly complex, and subject to contamination damage, as well as lacking flexibility of timing and selection of individual zones.

Sequencing valves which utilize fluid pressure variation to switch the valve discharge port being supplied have found great acceptance. Examples of the prior art in this category, which my invention described hereinafter constitutes an improvement over, are U.S. Pat. Nos. 2,642,022; 2,666,450; 2,833,309; 3,124,162; 3,369,565; 3,431,933; 3,472,265; 3,785,391; and my earlier patents Nos. 3,460,560; 3,524,470; 3,635,237; 3,747,620 and 3,924,652.

SUMMARY OF THE INVENTION

A primary object of the present invention is to provide an improved sequencing valve which is capable of operation over a wide flow range, including reliable operation at minimal fluid flow and pressure, which is free of water hammer effect and free of jamming of moving parts due to contamination, and in which one movable part system controls indexing or sequencing while a second movable part system controls internal sealing within the valve to control discharge flow selectively.

In accordance with the present invention, an actuation piston is positioned in the housing between the inlet port and the distributing valving member and is operatively connected to said distributing valving member to sequence this valving member into register with selected outlet ports as determined by a cam mechanism connected to said actuation piston and said valve housing, in response to pressure variations applied to said actuation piston. The actuation piston is configured so that positive actuation and sequencing is achieved before flow can pass through the valve. A seating surface is provided for the actuation piston so that it can also serve as a spring loaded reverse flow check valve to prevent back flow of water through the valve which when combined with an air venting port in the valve housing provides the necessary functions of an anti-siphon valve in addition to the basic distribution function. The valve housing and flow path is also configured to allow placing a primary flow path shut-off mechanism into the same housing so that the distributing valve may be connected directly to a continuously pressurized water source and serve to provide the shut-off, anti-siphon and distribution functions within a single compact unit.

In accordance with a further aspect of the present invention, all of the mechanism involved in valve indexing or sequencing is of simple design loose tolerances and located to minimize effects of any contaminants in the system.

A further feature of my sequencing valve is that it provides suction relief and back flow prevention so as to comply with the anti-siphon plumbing codes which prevail in many communities.

A still further feature of my valve is that it is compact in design in that its housing consists of a plurality of cylindrical members which are nested together and placed into flow communication by a cylinder intersection technique, which is easy to manufacture because of ease of the productability of the selected part shapes involved, and which is easy to maintain both because it is contamination-free and because access may be gained to all important valve parts for cleaning, repair or replacement, without disconnecting valve inlet or outlet plumbing.

It is a very important feature of my sequencing valve that it is adaptable by part inter-changeability, to operate in a variety of modes of operation and to be controlled in a variety of ways.

It is also an important feature of my valve that the indexing unit is readily removable and may be replaced by a different indexing unit to perform a different indexing or sequencing function and that the indexing unit includes one fixed cam member and two movable cam follower members.

It is a further important feature of my distributing valving member that a shut-off piston valve may easily be plugged into the housing to control the distributing valving members' inlet flow, and control it locally or remotely. The shut-off piston valve reciprocates within a horizontally oriented cylinder in the valve housing and closes into the flow for soft shut-off and positive back flow prevention even under high vacuum suction conditions at the valve inlet. The piston shut-off valve is configured to provide a large flow opening in a compact size for minimizing valve size and valve housing pressure loading stresses. This is a significant consideration when using plastics for the valve housing material.

A primary object of the present invention is to provide a sequencing valve which sequentially controls flow between the valve inlet and one or more of a plurality of valve outlets in response to selected system pressure variations.

It is an important feature of the present invention to provide a sequencing valve which completes its sequencing function before flow is permitted through the valve.

It is an important object of the present invention to teach a sequencing valve in which a primary flow control valve is actuated and sequentially controlled by a pressure responsive secondary member, such as a piston.

It is also an important object of this invention to teach a sequencing valve in which a lost motion connection is utilized between the primary flow control valve and the actuation piston, which controls the primary valve so that the primary valve may be fully sequenced and in its seated position before the actuation piston is moved to a position which permits line fluid flow thereto.

It is still a further object of this present invention to teach a sequencing valve which functions properly with loose mechanical tolerances, so as to be insensitive to contaminate jamming and which is easy to maintain, wherein all major parts are preferably of circular cross section and positioned concentrically about an axis, wherein a single spring serves to bias the valve to its unseated position, and wherein the valve can be sequenced in response to selected system pressure variation and at a minimum flow condition.

It is still a further object of this invention to teach such a sequencing valve in which the sequencing action is positive and in which line fluid flow therethrough cannot be established until valve sequencing and valve seating are completed, and further, wherein the sequencing valve is self-flushing.

It is still a further object of this invention to teach such a sequencing valve in which cam action between the stationary and the movable part of the sequencing valve causes the valve to sequence in rotary motion in response to reciprocating motion of an interconnected piston and rod.

It is still a further object of the present invention to teach such a sequencing valve in which the actuation and sequencing of the primary valve member within its housing is controlled by a pressure responsive member positioned between the housing inlet and the primary valve member so as to be responsive to line pressure acting thereagainst to sequence the ported primary valves into register with the select outlet port and overcome the unseating spring bias so that the primary valve may be closed easily by the pressure in the valve housing.

It is still a further object of the present invention to teach such a sequencing valve wherein the inlet port for line fluid flow into the valve housing is tangentially disposed so as to provide a location for a primary inlet shut-off valve which can be easily removed if required.

BRIEF DESCRIPTION OF THE DRAWINGS

FIG. 3 is a cross-sectional showing taken through the inlet section of my valve to illustrate a first embodiment;

FIG. 4 corresponds to FIG. 3 and illustrates a second embodiment of my valve;

FIG. 5 is a view taken along line 5—5 of FIG. 4;

FIG. 6 is a side view taken from the right hand side of the FIG. 4 embodiment of my valve;

FIG. 7 is a partial showing of the inlet section of my valve to illustrate a third embodiment of my valve;

FIG. 8 is a partial showing of the inlet section of my valve to illustrate a fourth embodiment of my valve;

FIG. 9 is a showing of a portion of the inlet section of my valve to illustrate a fifth embodiment of my valve;

FIG. 10 is an enlarged showing of a portion of my shut-off piston of FIG. 7 to illustrate the self-cleaning concept;

FIG. 11 is a developed view of my cam mechanism which causes my sequencing valve to index sequentially in rotation in response to piston reciprocation;

FIG. 12 is a showing of the inlet sleeve of the valve inlet section; and

FIG. 13 is a showing of a modification of the valving member and piston rod member.

DESCRIPTION OF THE PREFERRED EMBODIMENT

Figure 1:
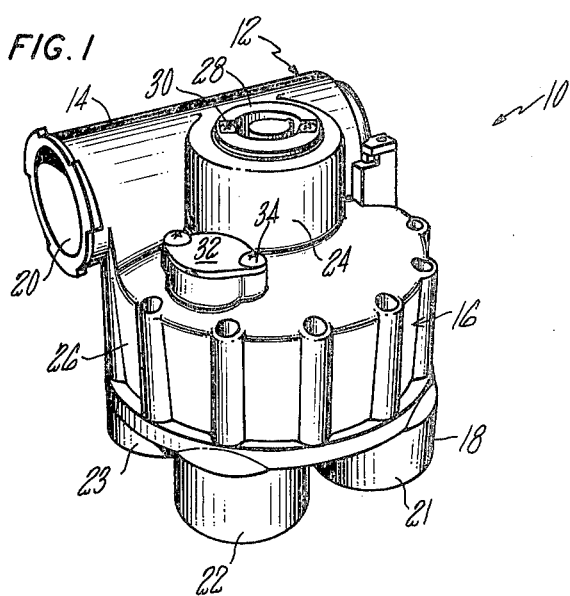
FIG. 1 is a perspective showing of my sequencing valve to illustrate compactness of construction.

Viewing FIG. 1 we see my sequencing valve 10, which will be described as usable in a watering system wherein valve 10 takes water from a source, such as city water, and selectively distributes it through one of its discharge ports to a selected area of use, which could be a sprinkler system on a lawn, garden, or other requirement. It should be borne in mind, however, that my sequencing valve could be used in any environment where fluid is to be distributed from a given source selectively to a plurality of requirement areas.

Valve 10 has a housing 12 which includes cylindrical inlet section 14, intermediate section 16 and outlet section 18. Inlet section 14 is adapted to be connected to the fluid source, such as the city water supply, which is joined thereto in conventional fashion at valve inlet 20. The various outlet ducts of outlet section 18, such as 21, 22 and 23, are each connected to a conduit system in conventional fashion which leads the fluid so discharged therethrough to a selected area for distribution. While only three outlet ducts are seen in FIG. 1, four are intended in the disclosed embodiment. Other desired numbers of outlet ducts could be used. Still viewing FIG. 1, it will be noted that intermediate section 16 includes cylindrical housing sections 24 and 26, which are concentric and that cylindrical inlet section 14 is normal thereto for purposes of packaging and to provide other advantages to be described hereinafter.

Indexing cylinder member 28 is received in an opening in the top of cylindrical section 24 and connected thereto by conventional means, such as bolt members 30 so that it may be easily removed for replacement or repair or to provide access to the interior of the valve. My anti-siphon mechanism 32 is removably connected to housing section 16 by conventional means, such as bolt members 34, so as to be removable therefrom for replacement, repair or access to the interior of the valve housing 12.

Figure 2:
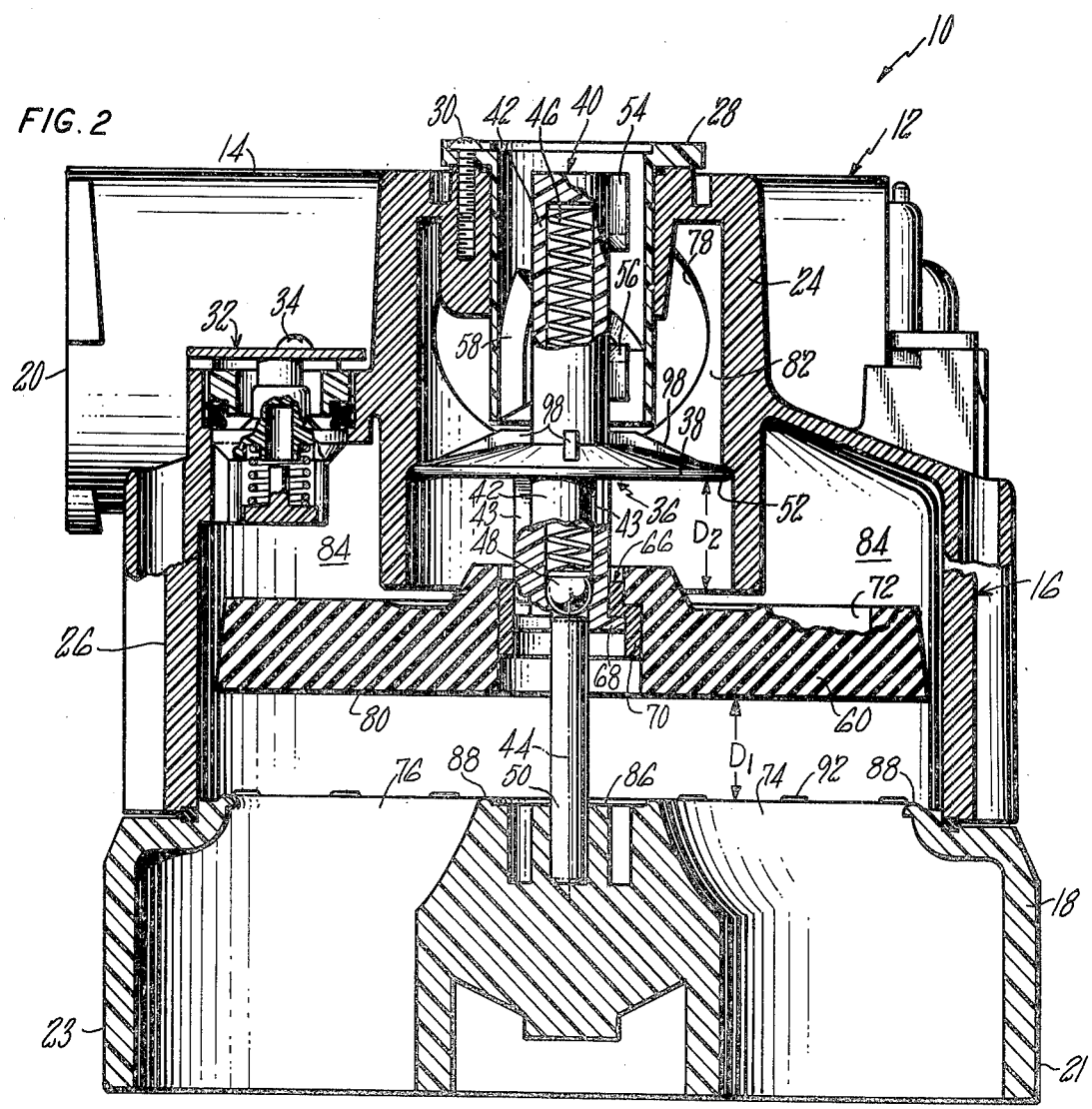
FIG. 2 is an enlarged showing taken through the intermediate and discharge sections of my valve.

Referring to FIG. 2, we see the interior of valve intermediate and outlet sections 16 and 18. It will be noted that a pressure sensitive device 36 is positioned within cylindrical section 24 and includes control or indexing piston member 38 which cooperates with cylinder 24 to form a piston-cylinder mechanism 40, which includes piston rod member 42 which is attached to piston 38 in conventional fashion for reciprocation therewith about axis 44 of housing sections 24, 26 and 18. Rod member 42 is hollow as shown and envelops single biasing spring 46 which bears against ball member 48, which is supported on a stationary support shaft 50, which is in turn supported from housing outlet section 18, and which acts at its opposite end against the interior of rod 42 to move rod and piston 38 to an end position wherein piston 38 bottoms in sealing relationship against an annular seat member 52 which is preferably produced in the inner surface cylindrical section 24.

Rod member 42 carries cam followers 54 and 56 so that these cam followers reciprocate with piston 38 and rod 42 in indexing housing 28 to which cam mechanisms 58 may be integrally or conventionally attached so as to perform an indexing function as described hereinafter. The opposite end of rod 42 is connected to distributing valving member 60 through a sliding connecting joint 66 wherein lip or flange member 68 projects from the end of rod 42 to contact central sleeve 70 of valving member 60. The central sleeve 70 is fixed in the valving member 60 and the rod 42 is keyed for sliding movement in joint 66 by keys 43. This permits valving member 60 and rod 42 to rotate together about axis 44. Valving member 60 includes at least one port 72, which may be selectively indexed as described hereinafter to come into register with one of the outlet ports, two of which are shown at 74 and 76, but it should be borne in mind that there are similar outlet ports for each of the discharge ducts 21, 22, 23 and others not shown.

Valve 10 is shown in its unseated or off position in FIG. 2. In operation, when fluid flows from inlet section 14 through communications port 78, formed by the intersection of cylindrical housings 24 and 14, the fluid will bear against the top of piston 38, to overcome the biasing force of spring 46 and move piston 38, together with piston rod 42, downwardly. The camming surfaces of 28 and the cam follower surface 54 of rod 42 interact during the downward movement to provide rotational sequencing of the distributing valving member 60 into registration with the next desired outlet port. It is important to note that distance $D_1$, between surface 80 of valving member 60 and the discharge ports (74 and 76 for example), is less than distance $D_2$, which is the distance between the seated position of piston 38 and the position at which piston 38 comes out-of-register with cylinder 24 to thereby permit the fluid which piston 38 had previously retained within cylindrical chamber 82 to flow into cylindrical chamber 84 and thence through registered port 72 of valving member 60 and desired outlet port for discharge. The fact that dimension $D_1$ is less than dimension $D_2$, insures that rotational indexing is completed and that valving member 60 can seat following rotational indexing before line pressure fluid is allowed to flow through the valve. Due to its own weight, or actuation piston end flow-by, distributing valving member 60 can seat on the various outlet ports, such as 74 and 76, with its discharge port 72 in register with a selected outlet port once the lifting bias of flange 68 is removed by the pressure forces on actuator piston 38. In view of the sliding connection 66, piston 38 and rod 42 can move downwardly until flange 68 bears against surface 86, to allow flow to pass through the valve.

It should be noted that each outlet port includes a circular sealing lip 88 therearound against which surface 80 of valving member 60 bears in sealing relationship. Valving member 60 is preferably made of a flexible material, such as rubber, neoprene, or any elastomeric material. A plurality of projections 92 extend into chamber 84 from the periphery of each outlet port seal 88 and serve to imbed themselves into surface 80 of flexible valving member 60 to thereby provide an inherent force attempting to unseat valving member 60 from the outlet ports. The force of the fluid pressure on the top of the valve, of course, prevents this when the valve is intended to be seated; however, such unseating force is of assistance during the valve unseating operation against small residual system pressures due to terrain elevation differences.

Assuming that valving member 60 is in its seated position, and is to return to its FIG. 2 unseated position, this will occur as the piston 38-rod 42 unit moves upwardly, biased by spring 42, to its FIG. 2 position. When flange 68 comes into contact with central member 70 of valving member 60 upon its return stroke, this force, coupled with the biasing action of projections 92, assist in the unseating of valving member 60. Valving member 60 thereafter is lifted by piston 38-rod 42 unit until piston 38 seats against valve seat 52 and the valve is back into its FIG. 2 unseated no-flow position.

Indexing of port 72 of distributing valving member 60 is accomplished during the reciprocating action of actuation piston 38 and rod 42 by the action of cam member 58 and cam follower members 54 and 56, as will now be described by referring to FIG. 11.

Cam followers 54 and 56 are axially spaced along and circumferentially offset with respect to axis 44 on rod 42 so that, as rod 42, and hence cam followers 54 and 56, commence their downward stroke from their FIG. 2 position, cam follower 54 will contact camming surface 94 of cam member 58, thereby causing cam follower 54 to rotate as it translates or reciprocates therealong, thereby also causing rod 42, piston 38, valving member 60 and cam follower 56 to rotate and to bring cam follower 56 to the position shown in phantom in FIG. 11 so that, as the assembly returns to its FIG. 2 position, cam follower 56 will then engage camming surface 96 and follow therealong and hence rotate as it reciprocates to thereby cause additional rotating of rod 42, piston 38 and valving member 60 to complete the indexing of valving member 60.

To insure that a siphoning backflow through the valve is not allowed by valve 10 due to decreased pressure at the pressure source, reduced pressure abatement device 32 is positioned in the valve housing as shown in FIG. 2 so as to communicate with the valve interior, in particular cylindrical chamber 84, and atmosphere. Reduced pressure abatement mechanism 32 is pressure sensitive so that, while normally closed, so that flow does not occur therethrough, it will open in response to a reduction in the pressure in chamber 84 to subatmospheric to therefore permit atmospheric air to pass into chamber 84 therethrough. By blocking the reverse flow through the valve with piston 38 seating on housing annular seat area 52 and allowing atmospheric air to enter the valve housing whenever the housing internal pressure goes less than atmospheric, back siphoning of possibly contaminated water from the system back into the source water supply (possibly city potable water supply) is prevented. The valve must be located at the high point of the serviced system for the function to be operative.

In a manner to be described hereinafter, the sequencing of valving member 60 is caused by controlling the pressure of the fluid being passed through communications port 78 so as to act upon piston 38 to thereby cause the alternate reciprocation in opposite directions of piston 38-rod 42.

Referring to FIG. 3, we see the construction of inlet section 14 in the first modification of my valve 10. Inlet section 14 includes cylindrical housing 100, which defines valve inlet 20 at one of its ends and which has inlet sleeve 102 sleeved thereinto. Extension lip 104 projects from, and is preferably integral with, sleeve 102. As best shown in FIG. 5, the interior of cylindrical housing 100 has a plurality of circumferentially spaced and axially extending projections 106, 108 and 110 projecting inwardly therefrom.

It will be noted by viewing FIG. 5 that projections 108 and 110 are positioned on opposite sides of a communications port 113 which places the interior 114 of the cylindrical housing 100 of inlet section 14 into communication with interior chamber 84 of intermediate section 26. A cylindrical blockage member 112 is sleeved into the opposite end of inlet section 14 and serves to block flow therebeyond. Each of the projections 106, 108 and 110 terminate in plane 116 so that skirt 118 of member 112 bottoms thereagainst when member 112 is in its fully seated position. At the same time, shoulder 120 between members 100 and 112 bottoms out.

As best shown in FIG. 6, blockage member 112 is locked into housing 100 as lug members 120 and 122 projecting therefrom are received in detents 124 and 126 of the housing in bayonet-lock fashion. It will accordingly be seen that blockage member 112 is locked in housing 100 by diametrically opposed bayonet locks 120-124 and 122-126. In addition, a second locking means is provided by bolting blockage member 112 to the housing by the use of bolt member 128 received in threaded recess 130. As best shown in FIG. 6, blockage member 112 carries cam follower lug 123 on the periphery thereof which cooperates with camming surface 125 of inlet housing 100, which camming surface 125 projects gradually out of the plane of the paper as shown in FIG. 6 so that as member 112 is rotated in clockwise unlocking direction, cam follower 123 will ride up on cammed surface 125 so as to cause member 112 to back out of inlet housing 100.

By viewing FIG. 5, it will be noted that inlet sleeve extension 104 extends between projections 108 and 110 and partially blocks communications port 113 in so doing. Inlet sleeve 102 includes axially extending indentures 132 and 134 (see FIG. 12) adjacent extension lip 104 into which projections 108 and 110 are matingly received.

In the FIG. 3 modification, arcuate blockage member 136 is utilized to cooperate with extension lip 104 and projections 108 and 110 to block flow into communications port 113, and hence flow from inlet section 14 to chamber 84 of intermediate section 126. Arcuate blockage member 136 abuts and extends between extension lip 104 and skirt 118 and abuts and extends between projections 108 and 110 to serve this flow blockage function. Accordingly, in the FIG. 3 construction, fluid enters inlet port 20, passes through inlet sleeve 102 and is then conveyed directly through communications port 78 into cylindrical chamber 82 of intermediate housing section 24 to act upon piston 38 and overcome the force of biasing spring 46 to move piston 38 and hence index valving member 60 and allow it to be seated in an operable position wherein the fluid goes from chamber 82 to 84 and hence through aligned ports such as 72 and 74 to be discharged through a selected outlet such as 21. The FIG. 3 configuration is the basic configuration and would be used in circumstances where the source water flow is to be modulated to sequence the flow from outlet to outlet and where the source flow can be shut off when desired by other means. This could be the configuration of the valve to be used with a pump that could be turned on and off to sequence the valve and left off when water flow is not desired.

In the FIG. 3 modification, port 113 is closed by the insert 136. However, for high flow system blockage, piece 136 could be removed and flow allowed to flow directly into chamber 84 from the inlet 20 through port 112. Actuation would then be achieved by flow pressure loss differences — differential pressure acting on actuation piston 38.

If the additional flow area from the valve inlet 20 into the housing 84 is desired while maintaining the ability to function as described for the FIG. 3 modification, a spring loaded piston can be installed into inlet section 14 as shown in FIG. 4. This piston then provides redundant back flow blockage as well as insuring that flow is routed to the center actuator piston until flow exceeds what can pass through the center actuator area and pressure differences across the piston force it to open port 113. Parts in the FIG. 4 modification which are common to the FIG. 3 modification will be given the same number. In the FIG. 4 modification, shut-off piston 140 is guided as shown in FIG. 5 between projections 106, 108, 110 and skirt 118 of end closure 112. Piston face 142 sealingly engages sealing lip 144 of inlet sleeve 102. Seal ring member 146 seals between piston 140 and skirt 118. Biasing spring 148 extends as shown between member 112 and piston 140 to bias the shut-off piston 140 to its FIG. 4 closed position. The cavity behind piston 140 in cylinder 112 is vented into the valve housing 84 through port 152 which aligns with passage 154 in housing 12 to place chamber 150 in communication with chamber 184, so that as pressure on the inlet side of piston 140 exceeds the pressure inside the housing 84 and inside cylinder chamber 150, the pressure differential forces will compress spring 148 and move piston 140 to the right, opening port 113 to allow the additional flow to pass through.

In the FIG. 4 construction, valve sequencing or indexing is accomplished by starting and stopping the flow at the valve inlet 20. This can be accomplished by a manually operated valve, turning on and off a pump, etc.

In operation, the FIG. 4 construction receives fluid through inlet 20, which fluid bears against piston 140 to overcome spring 148 and commences piston movement in a rightward direction. In view of the extension lip 104, the fluid is first ported around axially foreshortened projection 106, as shown by arrows in FIG. 5, through communications port 78 and then into chamber 82 to cause piston 38 to move downwardly towards the indexed position. The valving member 60 will operate as described in connection with the description of FIG. 2, although the slip connection between the distributing valve member 60 and actuation rod 42 would not be absolutely required since once actuation sequencing has occurred, flow through the valve can be provided by the action of piston 140, uncovering port 113 as it moves back towards the right under the differential pressure force of the inlet flow. Since 148 is sized relatively to the piston size so that a higher pressure differential is required to move the piston to uncover flow port 113 than is required to act on piston 38, thus insuring that the necessary pressure force will be available to sequence the distributing valve before significant flow can pass through the valve. When the valve is to be indexed to the next station, flow to the valve inlet is shut off. Piston 140 then moves back to the left, shutting off at the inlet and blocking back flow. Piston 38 and distributing valving member 60 return to their FIG. 2 position to partially index the valving member 60 as described earlier and, upon reapplication of normal pressure, shut-off piston 140 is opened and piston 38 and valving member 60 return to their valve seated position, fully indexed. In the FIG. 4 configuration, since bleed port 152 in spool 154 is not being used, it is blocked off by screw member 156. It will therefore be noted that to convert my valve from the FIG. 3 to the FIG. 4 modification, blockage member 136 is removed and shut-off piston 140 and spring 148 are installed. Another advantage of the FIG. 4 configuration is that by throttling the bleed port 152, the rate at which the piston 140 comes open can be controlled and reliable valve sequencing can be achieved, even when some flow and pressure surges may occur at the valve inlet 20, such as from a well and pump supply during start which could double-cycle some conventional types of distributing valves.

In the FIG. 4 embodiment, indexing may be accomplished by a flow control mechanism 20a, which may be a manual valve, an automatic valve or a timer actuated valve which is positioned in the inlet plumbing system to valve inlet 20 and is actuated to institute fluid flow to said valve 10 and hence open said shut-off piston 140 to initiate valve 10 operation. Mechanism 20a may also be actuated to discontinue flow to said valve 10 to cause said piston 140 to close, and then reinstitute flow to said shut-off piston 140, to thereby index said valving member 60.

Now referring to FIG. 7, we see still another embodiment of my sequencing valve in which the valve is going to be controlled, sequenced or indexed by solenoid action controlling the back pressure in chamber 150 behind shut-off piston 140. Except as now described, the valve modification shown in FIG. 7 is precisely as previously described in connection with the description of FIGS. 2 through 6. FIG. 7 differs from FIG. 6 in that bolt 156 has been removed and self-cleaning wire 160 is threadably supported from blockage member 112 and extends through passage 152 in valve spool 154 as shown in FIGS. 7 and 10. In the FIG. 7 construction, the fluid which enters inlet port 20 and passes through inlet sleeve 102 and seeps through passage 152 in spool 154 around self-cleaning wire 160 and into chamber 150. Solenoid 162 is normally in the closed position shown in FIG. 7 so that chamber 150 fills with the seeped water to fill cavity 150 with water at pressure $P_2$ acting over piston area $A_2$, which is larger than piston area $A_1$ defined by inlet sleeve 102 against which inlet water is acting at pressure $P_1$. Areas $A_1$ and $A_2$ are selected so that area $A_2$ is sufficiently larger than area $A_1$ that the combined force of biasing spring 148 and the product $P_2A_2$ is greater than the product $P_1A_1$, thereby normally keeping shut-off valve 140 in its closed position. In a construction, sleeve 102 may have an inner diameter of 1.3 inches and piston 140 a diameter of 1.65 inches. To place valve 10 in operation in the FIG. 7 modification, solenoid 162 is actuated to unblock passage 166 and thereby establish flow communication between bleed passages 164, 166 and 168 so as to bleed chamber 150 into the lower pressure chamber 84 of housing 12. The cross-sectional areas of bleed passage 164, 166 and 168 are chosen to be substantially larger, preferably about four times as large, as the flow area between self-cleaning wire 160 and bleed passage 152 so that chamber 150 is quickly depressurized and shut-off valve 140 opens to cause piston 38 and valving member 60 to move downwardly to permit valving member 60 to be seated. To index valving member 60, solenoid 162 is deenergized to block flow from chamber 150 so that fluid builds up therein through passage 152 and coacts as previously described with biasing spring 148 to shut-off piston 140, thereby causing piston 38 and valving member 60 to come to their FIG. 2 partially-indexed position, whereupon solenoid 162 is then actuated to open communication between passage 164 and passages 166 and 168 to bleed chamber 150 to again open shut-off piston 140 and thereby move piston 38 and valving member 60 to the seated position of valving member 60, fully indexed as previously described.

Preferably, as best shown in FIG. 10, aperture or passage 152, is threaded or serrated as shown, which generates additional turbulence and allows running a larger clearance between the center wire and the hole inner diameter and still maintain the same flow restriction. Also the thread proves a longer but larger passage area for less sensitivity to dirt, so that as it moves along self-cleaning wire 160, the passage is kept free of contaminants and the attendant blockage. In the FIG. 7 construction, solenoid 162 may be operated at the valve or remotely by conventional actuator 170, or may be timer operated. A timer of the type taught in my U.S. patent application Ser. No. 562,650, now U.S. Pat. No. 4,029,918 could be used for this purpose.

In the FIG. 8 construction, my valve 10 will be caused to sequence in the same fashion as the FIG. 7 modification but this time by a remotely located solenoid 172, which performs the same function as the FIG. 7 solenoid 162, but which serves to join conduit member 174 to conduit member 176 when actuated to permit flow therebetween, thereby bleeding chamber 150 to atmosphere through conduit 174, connecting member 178, and conduit 176. When venting the cylinder cavity to atmospheric pressure, the piston is forced full open by the normal housing pressure for a minimum pressure drop valve configuration. When solenoid 172 is brought to its FIG. 8 closed position, bleeding of chamber 150 is discontinued and the shut-off piston 140 will close as described in connection with FIG. 7. Again, the remote solenoid 172 of the FIG. 8 construction can be controlled by a conventional solenoid actuator mechanism 170 or a timer mechanism.

Still another modification of my valve 10 is shown in FIG. 9 wherein the plug-in shut-off valve 140 is constructed as shown in FIG. 4 and wherein clean and/or filtered water is supplied at $P_1$, is introduced through conduit 182, restriction 184, and around solenoid 186 into chamber 150, at pressure $P_3$, which is equal to pressure $P_1$ when solenoid 186 is deenergized and prevents bleed flow from chamber 150 through passages 164 and 166 into a valve interior chamber, such as 84. Since pressure $P_1$ is selected to be equal to or greater than inlet pressure $P_2$, and since the area differential previously described in connection with FIG. 7 exists, shut-off piston 140 will be biased by spring 148 and this pressure differential to its FIG. 9 closed position.

To open shut-off piston 140, solenoid 186 is energized either at the valve or remotely by a control means 170. The solenoid plunger 186 moves to the right against its spring, which keeps it normally closed against one end of passage 166, by the action of the electric field closing pressurizing port 184 and quickly bleeds chamber 150 by joined passages 164 and 166 so that pressure $P_3$ and $P_4$ in chamber 84 are quickly equalized and shut-off piston 140 opens for activation of valve 10. To sequence valve 10, solenoid 186 is deenergized to interrupt communication between passages 164 and 166 and thereby close shut-off piston 140 and, with the subsequent energization of solenoid 186, shut-off piston 140 will reopen to complete the indexing of valving member 60 as previously described.

In the modification shown in FIG. 13, the distributing valving member 260 is not a flat disc on the bottom, but has the shape of a shallow hollow cone. When inlet pressure forces have pushed the actuator piston 238 down to the position shown in FIG. 13, this is the position at which rotational indexing of the distributing valving member 260 by the piston rod 242 is completed, the outside edges of the distributing valving member 260 touch the bottom around the outside circumference and seals on a circumferential ring 300 around the surface of bottom. In this modification, the bottom of the piston rod 242 is rigidly fixed in the distributing valving member 260. If there is sufficient pressure and flow, the force on top of actuator piston 238 will force the piston farther down so that the outer circumference clears the lower end of the cylinder 24 and allows additional flow to pass through (see fragmentary section of piston 238 in dot-dash lines). This additional travel of piston rod 242 deflects the center of the resilient coned bottom disc downward. If there is sufficient pressure and flow, the actuator piston 238 will be forced downward completely, mating bottom coned surface 280 with the seal rings around each of the outlets 290. However, if there is not sufficient flow, then a gap will remain until pressure inside the housing 84 begins to build up, at which time the housing pressure on top of the distributing valving member 260 will force the center of the valving member down since the outlet area under the distributing valving member is seeing atmospheric, or only very low flow pressure from some under disc cross leakage from port 272 until the disc center is fully seated by the pressure.

The pressure deflection of the center of the distributing valving member pulls the actuator piston 238 clear of surface 253 and opens the flow area past the actuator piston.

It will therefore be seen that my sequencing valve 10 is fabricated so that it can be modified in several ways to perform its sequencing operation, depending upon the requirements of the system. It will further be evident to those skilled in the art that with my one basic sequencing valve, with the interchange of hardware just described, my basic sequencing valve 10 can be assembled to operate as previously described in connection with the FIGS. 3, 4, 7, 8 or 9 modifications.

I claim:
1. A sequencing valve automatically responsive to pressure variation comprising:
(A) a housing including
  (1) a cylindrical inlet section having a first interior cylindrical chamber defining an inlet port,
  (2) an outlet section defining a plurality of outlet ports, and
  (3) an intermediate section positioned therebetween and including:
    (a) a first cylindrical section having a second interior cylindrical chamber communicating with said outlet ports,
    (b) a second cylindrical section having a third interior cylindrical chamber positioned concentrically with and opening into said second interior cylindrical chamber,
    (c) said second cylindrical section intercepting said cylindrical inlet section to place their first and third interior cylindrical chambers into communication,
  (4) said cylindrical inlet section extending on either side of the location where said second cylindrical section intercepts said cylindrical inlet section, said first interior cylindrical chamber being open at both ends, removable sleeve means having a closed end being located in one open end of the cylindrical chamber, said other open end being defined by the inlet port,
(B) a valving member located in said second interior cylindrical chamber of said housing intermediate section and having at least one port therein,
(C) pressure sensitive means for controlling said valving member between a seated and unseated position wherein the seated position the valving member port registers with one of said housing outlet ports while the remainder of the valving member blocks flow through the remaining housing outlet ports, and for rotational indexing motion wherein said valving member port is indexed to be in register with a second outlet port in response to pressure variation and including:
  (1) a piston member positioned in said third interior cylindrical chamber of said housing intermediate section to form a piston-cylinder assembly therewith which is operative in response to pressure variations between a closed position wherein flow therethrough is prevented and an open, out-of-register position wherein flow from said third interior cylindrical chamber to said second interior cylindrical chamber and said valving member is permitted,
  (2) a stem means connecting said piston member to said valving member, and
  (3) cam means operatively connected to said housing and said stem means to cause said valving member to be sequentially indexed in response to pressure variations so that the valving member port will be in register with said second outlet port.

2. A combination as set forth in claim 1 including means to lock said sleeve means in said housing.

3. A combination as set forth in claim 2 including cam means on said cylindrical inlet section and said sleeve means to cause said sleeve means to back out of said cylindrical member section in response to rotation of said sleeve member.

4. A combination as set forth in claim 1 including a first communication port between said first interior cylindrical chamber of said cylindrical inlet section and said third interior cylindrical chamber of said intermediate section second cylindrical section, a second communication port between said first interior cylindrical chamber of said cylindrical inlet section and said second interior cylindrical chamber of said intermediate section first cylindrical section, a plurality of axially extending projections circumferentially spaced about the first interior cylindrical chamber of said cylindrical inlet section with two of said projections positioned on opposite sides of said first communication port and with two of said projections positioned at opposite sides of said second communication port, said sleeve means having an open end positioned adjacent a plurality of said projections when said sleeve means is in its fully inserted position, a fixed inlet sleeve means in said first interior cylindrical chamber adjacent the inlet port.

5. A combination as set forth in claim 4 having an extension lip projecting from said inlet sleeve means and extending between said projections on opposite sides of said second communication port, an arcuate blockage member extending between said sleeve means and said extension lip and also between said projections on opposite sides of said second communication port to cooperate with said extension lip and sleeve means to block off said second communication port and place said cylindrical inlet section chamber in communication with said first inlet port only.

6. A combination as claimed in claim 5 wherein said arcuate sleeve member is sized and shaped to be press fitted into position and thereby readily insertable and removable.

7. A combination as set forth in claim 4 including a flow shut-off piston positioned in said cylindrical inlet section and sized to be guided by said projections and the inside of said sleeve means as it reciprocates along the axis of the cylindrical inlet housing, means biasing said shut-off piston to one end of its travel where it sealingly engages said inlet sleeve means to block flow therebetween and hence into either of said communication ports, and means sealing between said shut-off piston and said sleeve means.

8. A combination as set forth in claim 7 including means to provide clean or filtered water at a pressure equal to or greater than valve inlet pressure into the chamber defined between said shut-off piston and said cylindrical enclosure member to close said shut-off piston, and means to first bleed and then prevent bleed flow from said chamber between said shut-off piston and said cylindrical blockage member while so supplying said clean water to thereby index said valve member.

9. A combination as set forth in claim 8 wherein said bleed means comprises conduit means in said cylindrical sleeve member joining the chamber between said shut-off piston and said cylindrical sleeve member to a low pressure region, and a solenoid member actuatable to control flow through said conduit means and thereby bleed or block bleeding of said chamber between said shut-off piston and said cylindrical sleeve means and index said valve member.

10. A combination as set forth in claim 9 and including a selectively remotely located control means or timer to actuate said solenoid means.

11. A combination as set forth in claim 7 including interchangeable means to adapt said valve for indexing in response to supply pressure variation or shut-off piston back pressure variation.

12. A combination as set forth in claim 7 wherein an extension lip projects from said inlet sleeve means and extends between said projections on opposite sides of said second communication port, one of said projections is axially fore-shortened so that as said shut-off piston moves away from said inlet sleeve means, fluid communications is initially established thereby to said first communication port only until said shut-off piston clears said extension lip and, thereafter, to both of said communication ports.

13. A combination as set forth in claim 12 wherein a chamber is formed between said shut-off piston and said sleeve means, bleed means venting the chamber formed between said shut-off piston and said sleeve means.

14. A combination as set forth in claim 13 including a bleed aperture extending axially through the center of said shut-off valve to bleed fluid from said inlet port into the chamber between said shut-off valve and said sleeve means, a self-cleaning wire fixedly supported from said sleeve means and extending through said bleed aperture so that when the shut-off piston reciprocates along the wire, the aperture formed therebetween is cleared of foreign matter.

15. A combination as set forth in claim 13 wherein said shut-off piston bleed means consists of passages through said sleeve means and into the valve interior, and a solenoid member actuatable to control flow through said bleed passages and thereby cause reciprocation of said shut-off valve to index said valve member.

16. A combination as set forth in claim 15 including remotely located control means or a timer to selectively control said solenoid and hence selective reciprocating of said shut-off piston to thereby index said valve member.

17. A combination as set forth in claim 15 wherein said shut-off piston bleed aperture is threaded or otherwise is irregular in shape and wherein said self-cleaning wire is of smooth exterior surface, and further wherein the area of said aperture formed therebetween is smaller than the area of the shut-off piston bleed means passages, and still further wherein the cross-sectional area of the bleed piston adjacent the sleeve means is greater than the cross-sectional area of the inlet sleeve, and further wherein said solenoid is normally closed to prevent flow through said shut-off piston bleed means passages and is actuated to an open position to permit the bleeding of fluid through said shut-off piston bleed means passage to thereby control valve actuation and indexing.

18. A combination as set forth in claim 13 wherein said bleed means is a solenoid member selectively located at a remote station with respect to said valve, conduit means connecting the chamber between said shut-off piston and said cylindrical sleeve member to said solenoid, conduit means joining the solenoid to atmosphere so that actuation of said solenoid establishes bleed flow from said chamber between said shut-off valve and said cylindrical sleeve member to atmosphere through said conduit means to thereby open said shut-off piston and seat said valve member, and wherein said solenoid in its normal position prevents bleed flow through said conduit means to thereby close said shut-off piston and unseat said valve member, and further so that when said solenoid first blocks said bleed flow then permits said bleed flow, said valve member is indexed.

19. A combination as set forth in claim 18 including a selectively remotely positioned control switch or timer to control actuation of said solenoid and hence indexing of said valve member.

20. A combination as set forth in claim 4 having an extension lip projecting from said inlet sleeve means and extending between said projections on opposite sides of said second communication port, flow shut-off means positioned in said cylindrical inlet section for permitting flow through said inlet sleeve means to said first communication port prior to being directed to said second communication port.

21. A combination as set forth in claim 1 including a flow shut-off piston positioned in said first interior cylindrical chamber, inlet sleeve means fixed in said chamber adjacent said inlet port, means biasing said piston to seat against said inlet sleeve means, means to provide water at a pressure into the chamber behind said piston, for moving said piston to a closed position and means to selectively bleed said chamber behind said piston to index said valving member.

22. A combination as set forth in claim 1 including a first communication port between said first interior cylindrical chamber of said cylindrical inlet section and said third interior cylindrical chamber of said intermediate section second cylindrical section, a second communication port between said first interior cylindrical chamber of said cylindrical inlet section and said second interior cylindrical chamber of said intermediate section first cylindrical section, said inlet port being connected through said first communication port to said piston member and through said second communication port to said valving member.

23. A combination as set forth in claim 22 wherein means are provided to control flow through said first communication port and said second communication port, said means directing flow to said piston member prior to being directed to said valving means.

24. A sequencing valve automatically responsive to pressure variation comprising:
(A) a housing including
 (1) a cylindrical inlet section having a first interior cylindrical chamber defining an inlet port,
 (2) an outlet section defining a plurality of outlet ports, and
 (3) an intermediate section positioned therebetween and including:
  (a) a first cylindrical section having a second interior cylindrical chamber communicating with said outlet ports,
  (b) a second cylindrical section having a third interior cylindrical chamber positioned concentrically with and opening into said second interior cylindrical chamber,
  (c) said second cylindrical section intercepting said cylindrical inlet section to place their first and third interior cylindrical chambers into communication,
(B) a valving member located in said second interior cylindrical chamber of said housing intermediate section and having at least one port therein,
(C) pressure sensitive means for controlling said valving member between a seated and unseated position wherein the seated position the valving member port registers with one of said housing outlet ports while the remainder of the valving member blocks flow through the remaining housing outlet ports, and for rotational indexing motion wherein said valving member port is indexed to be in register with a second outlet port in response to pressure variation and including:
 (1) a piston member positioned in said third interior cylindrical chamber of said housing intermediate section to form a piston-cylinder assembly therewith which is operative in response to pressure variations between a closed position wherein flow therethrough is prevented and an open, out-of-register position wherein flow from said third interior cylindrical chamber to said second interior cylindrical chamber and said valving member is permitted,
 (2) a stem means connecting said piston member to said valving member, and
 (3) cam means operatively connected to said housing and said stem means to cause said valving member to be sequentially indexed in response to pressure variations so that the valving member port will be in register with said second outlet port,
(D) said second cylindrical section of said housing intermediate section including a circular sealing surface sized and positioned so that said piston member will sealably bear thereagainst when at one end of its reciprocating travel.

25. A combination as set forth in claim 24 including suction abatement means positioned in said housing and operable to admit atmospheric pressure into said housing chambers when the pressure within said housing chambers falls a selected amount below atmospheric pressure.

26. A combination as set forth in claim 1 including interchangeable means to adapt said valve to be indexable in response to supply pressure variations or to variations of at least one pressure existent within the valve housing.

27. A combination as set forth in claim 24 including:
(D) said valving member is fixed against axial movement on said stem means adjacent the bottom thereof, said bottom surface having a cone shape extending inwardly at the center thereof, the depth of the cone being such that the piston member will mate the bottom of the cone surface with the outlet section when it moves to an open position.

28. a combination as set forth in claim 24 including biasing means for biasing said piston member to its closed position to prevent flow thereby until sufficient pressure has been generated to overcome said biasing means and for biasing said valving member to its unseated position.

29. A sequencing valve comprising a housing, said housing including an inlet port and an outlet section having a plurality of outlet ports, said housing having a first chamber connected to said outlet ports, said housing further defining an internal flow passage whereby fluid communication may be established between said inlet port and said first chamber, said internal flow passage having an opening entering into said first chamber, a valving member located in said first chamber having at least one port therethrough, said valving member being movable between a seated and unseated position, in the seated position a valving member port registers with one of said housing outlet ports while the remainder of the valving member blocks flow through the remaining outlet ports, in the unseated position the valving member is spaced from said outlet ports, piston means located in said housing for cooperation with said opening in said internal flow passage, said piston means being movable between a position where it coacts with said internal flow passage to prevent flow therethrough to a position allowing flow from said opening of said internal passage into said first chamber, stem means connecting said piston means to said valving member, biasing means for biasing said piston means into a position coacting with said opening in said internal passage to prevent flow therethrough until sufficient pressure has been generated to overcome said biasing means and for biasing said valving member into its unseated position, said housing having a circular sealing surface for said piston means to sealably bear against when fully biased by said biasing means to prevent reverse flow around said piston means back into said inlet port, said piston means being movable to its position in said first chamber allowing flow in response to sufficient pressure generated at said inlet port, said movement of said piston means permitting said valving member to move to its seated position, cam means operatively connected to said housing and said stem means to cause said valving member to be rotatably indexed in response to movement of said piston means by proper pressure variations and said biasing means so that said valving member port can be sequentially aligned with each of said outlet ports.

30. A combination as set forth in claim 29 including suction abatement means in said housing operable to admit atmospheric pressure into said first chamber when the pressure within said chamber falls a selected amount below atmospheric pressure.

31. A sequencing valve comprising a housing, said housing including an inlet port and an outlet section having a plurality of outlet ports, said housing having a first chamber connected to said outlet ports, said housing further defining an internal flow passage whereby fluid communication may be established between said inlet port and said first chamber, said internal flow passage including a second chamber having an opening entering into said first chamber, a valving member located in said first chamber having at least one port therethrough, said valving member being movable between a seated and unseated position, in the seated position a valving member port registers with one of said housing outlet ports while the remainder of the valving member blocks flow through the remaining outlet ports, in the unseated position the valving member is spaced from said outlet ports, piston means located in said housing for cooperation with said opening in said second chamber, said piston means being movable between a position where it coacts with said opening in said second chamber to prevent flow therethrough to a position in said first chamber allowing flow from said opening of said second chamber into said first chamber, stem means connecting said piston means to said valving member, biasing means for biasing said piston means into a position coacting with said opening in said second chamber to prevent flow therethrough until sufficient pressure has been generated to overcome said biasing means and for biasing said valving member into its unseated position, said second chamber having a circular sealing surface for said piston means to sealably bear against when fully biased by said biasing means to prevent reverse flow around said piston means back into said inlet port, said piston means being movable to its position in said first chamber allowing flow in response to sufficient pressure generated at said inlet port, said movement of said piston means permitting said valving member to move to its seated position, cam means operatively connected to said housing and said stem means to cause said valving member to be rotatably indexed in response to movement of said piston means by proper pressure variations and said biasing means so that the valving member port can be sequentially aligned with each of said outlet ports.

* * * * *